US012775672B2

(12) United States Patent
Nguyen et al.

(10) Patent No.: US 12,775,672 B2
(45) Date of Patent: *Oct. 27, 2026

(54) QR CODE ACCESS RESTRICTION WITHOUT GEOLOCATION KNOWLEDGE

(71) Applicant: Capital One Services, LLC, McLean, VA (US)

(72) Inventors: Tam Nguyen, Rowlett, TX (US); Gerardo Fang, El Paso, TX (US); Venkata Sudharsan Dasa, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,504

(22) Filed: Jul. 11, 2024

(65) Prior Publication Data

US 2024/0362290 A1 Oct. 31, 2024

Related U.S. Application Data

(63) Continuation of application No. 17/179,728, filed on Feb. 19, 2021, now Pat. No. 12,067,071.

(51) Int. Cl.
*G06F 16/955* (2019.01)
*G06F 21/36* (2013.01)
(Continued)

(52) U.S. Cl.
CPC ........ *G06F 16/9554* (2019.01); *H04L 9/3228* (2013.01); *H04L 67/01* (2022.05); *H04L 67/146* (2013.01)

(58) Field of Classification Search
CPC ........................... H04L 67/146; G06F 16/9554
See application file for complete search history.

(56) References Cited

U.S. PATENT DOCUMENTS

| | | | |
|---|---|---|---|
| 6,766,298 | B1 | 7/2004 | Dodrill et al. |
| 10,325,087 | B1 | 6/2019 | Goodsitt et al. |

(Continued)

OTHER PUBLICATIONS

"Stackoverflow, Only allow access to URL in certain locations (qr codes), Jul. 23, 2015, https://stackoverflow.com/questions/31586548/only-allow-access-to-url-in-certain-locations-qr-codes" (Year: 2015).

*Primary Examiner* — Nicholas R Taylor
*Assistant Examiner* — Ho T Shiu
(74) *Attorney, Agent, or Firm* — Sterne, Kessler, Goldstein & Fox P.L.L.C.

(57) ABSTRACT

Provided herein are system, method and/or computer program product embodiments, and/or combinations and sub-combinations thereof for controlling access to a website. In some embodiments, a user scans a machine-readable indicia with their mobile device to access a backend redirect page. The backend redirect page receives the access request, generates a unique session identifier, and configures a dynamic address based on the unique session identifier. The backend redirect page redirects the mobile device to an intake page of a website using the dynamic address for that page. Whenever the user attempts to load a page in the website using the corresponding dynamic address, an intake backend for frontend verifies the validity of the unique session identifier associated with the dynamic address. A session monitor tracks the amount of time since the unique session identifier was generated and invalidates the unique session identifier after a predetermined amount of time has passed.

20 Claims, 3 Drawing Sheets

(51) Int. Cl.

| | |
|---|---|
| ***H04L 9/32*** | (2006.01) |
| ***H04L 67/01*** | (2022.01) |
| ***H04L 67/146*** | (2022.01) |

(56) References Cited

U.S. PATENT DOCUMENTS

| | | | | |
|---|---|---|---|---|
| 10,511,589 | B2 | 12/2019 | Gangawane et al. | |
| 10,678,894 | B2 | 6/2020 | Yin et al. | |
| 2007/0245027 | A1 | 10/2007 | Ghosh et al. | |
| 2011/0078769 | A1 | 3/2011 | Tsubaki et al. | |
| 2013/0041734 | A1 | 2/2013 | Dean et al. | |
| 2013/0151552 | A1 | 6/2013 | Sugawara et al. | |
| 2014/0359578 | A1* | 12/2014 | Jesse | G06F 8/61<br>717/124 |
| 2017/0185786 | A1* | 6/2017 | Ylinen | H04L 63/0861 |
| 2019/0311341 | A1 | 10/2019 | Rice | |
| 2020/0005295 | A1 | 1/2020 | Murphy | |
| 2020/0125700 | A1 | 4/2020 | Chang et al. | |
| 2020/0127832 | A1 | 4/2020 | Ebrahimi | |
| 2021/0112072 | A1* | 4/2021 | Kratzer | G06F 16/9566 |
| 2022/0269747 | A1 | 8/2022 | Nguyen et al. | |

* cited by examiner

QR CODE ACCESS RESTRICTION WITHOUT GEOLOCATION KNOWLEDGE

CROSS-REFERENCE TO RELATED APPLICATIONS

This application is a continuation of U.S. patent application Ser. No. 17/179,728 entitled "QR Code Access Restriction Without Geolocation Knowledge," filed Feb. 19, 2021, which is hereby expressly incorporated herein by reference in its entirety.

BACKGROUND

Websites can be used to gather information from users for a variety of reasons, such as surveys or pre-approval for services. These websites can be accessed through a variety of means, including readable links such as Quick Response (QR) codes. Users often use mobile devices to read the QR codes, which then allow the users to access the website and enter or receive information. Such readable links may typically be saved by a user for later access. Or, a user may access a website using a readable link, and bookmark the site to visit later. Without having some control over when or where a user enters data into the website, the website owner may lose valuable information about that user or miss out on opportunities to interact with that user.

BRIEF SUMMARY

Disclosed herein are system, method and computer program product embodiments, and/or combinations and sub-combinations thereof for restricting access to a website.

In an embodiment, a method for controlling access to a website includes receiving a request from a mobile device to access a backend redirect page using an address. The backend redirect page then generates a unique session identifier and an address to the website based on the unique session identifier and redirects a browser on the mobile device to the website using the address. An intake backend for frontend (referred to herein as IBFF or intake BFF) verifies whether the unique session identifier for the address is valid and either grants or denies the mobile device access to the website based on the validity of the unique session identifier.

In an embodiment, a system for controlling access to the website has processors and memory connected and stores instructions that provide a website with pages having configurable addresses. The system also provides a backend redirect page configured to, in response to receiving a request to access the backend redirect page from a mobile device using an address, generate a unique session identifier, configure the configurable addresses based on the unique session identifier, redirect the browser on the mobile device to a page from in the website using the configured address for that page, and determine whether unique session identifiers corresponding to the configured addresses are valid. The system further provides an intake backend for frontend configured to, in response to receiving a request from the mobile device to access a page of the website, query the backend redirect page to determine whether the unique session identifier corresponding to the configured address of the page is valid and, based on the query, either grant or deny the mobile device access to the website based on the validity of the unique session identifier.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
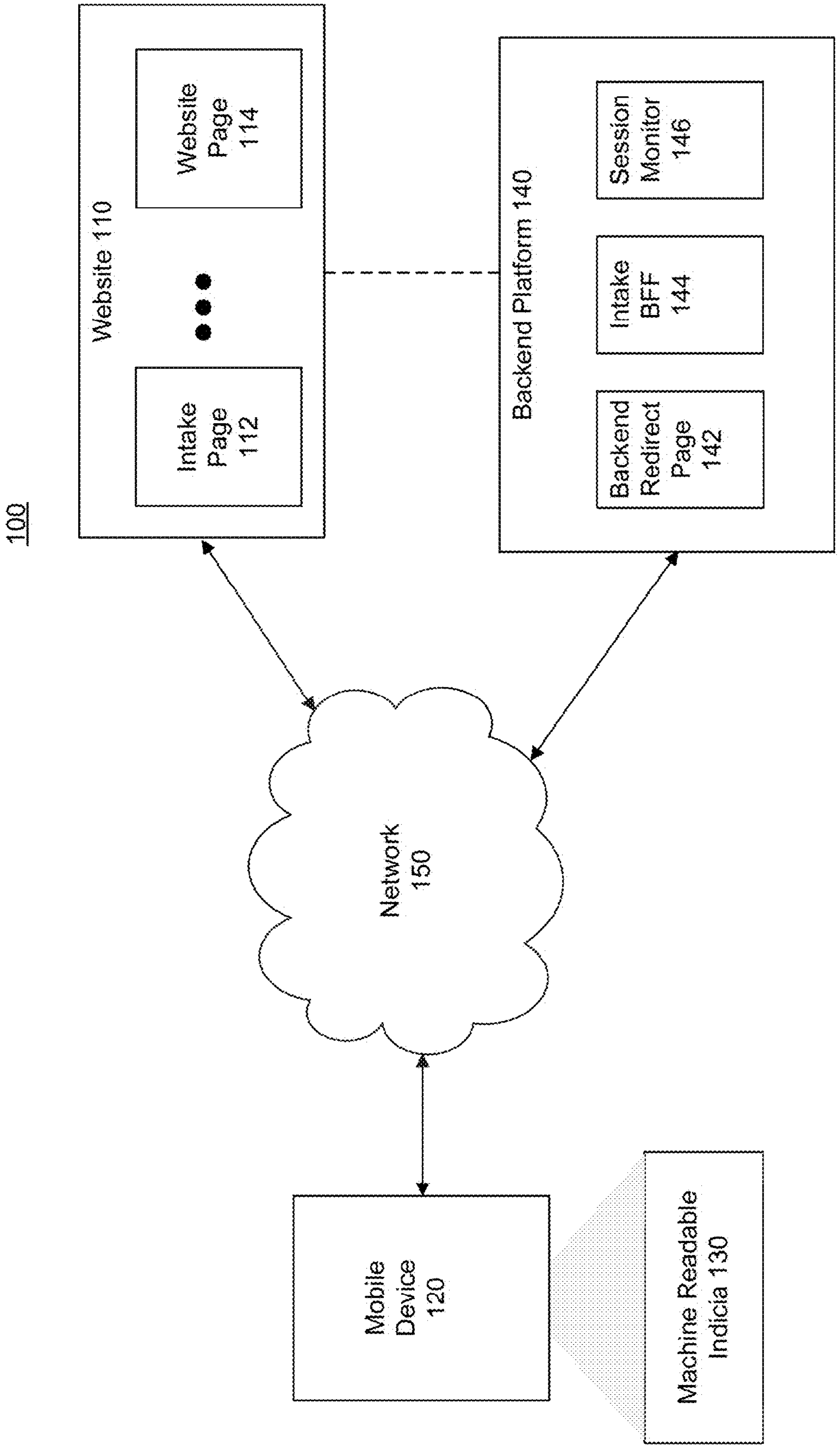
FIG. 1 illustrates a block diagram of an example environment in which systems and methods described herein may be implemented, according to some embodiments.

Provided herein are system, method and/or computer program product embodiments, and/or combinations and sub-combinations thereof, for restricting access to a website.

A website owner may be interested in restricting access to users based on user location. This may have to do with the nature of the service provided through the website or be based on the desire or necessity of having someone on hand to assist the user in interacting with the website. Even if the website owner only provides the user with website details when the user is at a specific location, the user may be able to use a bookmark to access the website later. This may allow the user to re-visit the website when they potentially cannot properly make use of the services, such as after leaving a location associated with the service.

As an example, some websites have intake forms that collect user information to provide a service, such as determining whether a user qualifies for a car loan at a car dealership. Because specific details of the sale are needed to finalize the loan and calculate, for example, a monthly payment or eligible APR, the dealership and/or the bank servicing the loan may want to restrict access to the website to only when the user is at the car dealership. This allows the user to receive help from salespeople and actually evaluate and process the loan, if the user desires. It can also help avoid problems where users fill out the forms on their own and show up at the car dealership expecting a loan, only to find out that there is some issue with how they filled out the forms, or some difference in how they calculated the value or price of a car to be purchased.

One way to control access is to have the user provide location information from the user's mobile device. This can effectively restrict access based on where the user is located. Even if the user uses a bookmark to access the website later, their location information will prevent them from accessing the website. However, users often decline to or are unable to provide location-based information from their mobile devices due to privacy concerns. This can result in problems accessing the website even when the user is at the proper location, such as at the business.

As another approach, and in accordance with embodiments of the present invention, a website owner may use backend network services to restrict access to the website. For example, the website owner may provide a machine-readable link, such as a QR code, to a user. This QR code accesses a redirect page that does not visibly load in the user's web browser. The redirect page, which may be hosted on the backend of the network, may initiate a new session for the user and generate a unique session ID for the session, then redirect the user to the website. The address for the website can be dynamic and include information that links the address to the unique session ID. Backend services can monitor visits to the website based on the unique session ID determined from the dynamic address. The backend services can determine whether the unique session ID is valid based on various parameters, such as how long it has been since the associated session was started. Once the unique session ID has become invalid (e.g., expires), the backend services block the user from accessing the website.

From the user side, the user can scan the QR code and navigate directly to the website without even noticing that the redirect is taking place. The user can interact with the website based on parameters controlled by the website owner. However, all of the control is transparent to the user, as it is handled on the backend of the network. The user is not required to disclose any personal data, such as the location information from their mobile device. While the user can bookmark the website address, once the unique session ID associated with the dynamic address is invalidated, the user will have to return to the original QR code to start a new session. A website owner will thus be able to control access to the website based on where the user has access to the QR code and prevent or limit unintended or undesired access to the websites by users.

FIG. 1 illustrates a block diagram of an example environment 100 in which systems and methods described herein may be implemented, according to some embodiments. The example environment 100 includes a website 110, a mobile device 120, a machine-readable indicia 130, a backend platform 140, and a network 150. The website 110 may be accessible to the mobile device 120 and the backend platform 140 through the network 150. The website may be connected to the backend platform 140 through a direct connection, as indicated by the dotted line between the two. The website 110 and the backend platform may be hosted together in a server or hosted in different servers that are connected through the network 150 or a cloud. The network 150 may be a single network or several networks connected through the internet.

In some embodiments, the website 110 may be deployed to provide a service to users. The website 110 may have an intake page 112 and website pages 114. The intake page 112 may be a home page, main page, or landing page where a user may begin to navigate the website 110. The website pages 114 may be other pages in the website 110 or sub-pages of the intake page 112.

The website 110 may use configurable or dynamic addresses for the intake page 112 and the website pages 114. The configurable addresses allow a page 112 to be accessed with different addresses, where each address is associated with a specific user or user session.

For example, a car dealership may wish to provide a service for connecting a customer with a bank such that the customer can be pre-approved for an auto loan. This can be accomplished through a website 110 with an intake page 112 for an application where the customer can fill out their information. As the customer proceeds through the application process, the customer accesses each of the website pages 114 to finish providing the necessary information. The configurable address may each be modified to identify the specific customer or instance for which the application is being completed. Once the forms are finished, the customer may submit their application from the website for review.

Access to the website 110 may be provided through a link, which the user may access through their mobile device 120. The mobile device 120 may be a smart phone, tablet, or other portable electronic device capable of accessing the internet. In an embodiment, the link may be provided in the form of a machine-readable indicia 130, such as a QR code.

Receiving the link may cause the mobile device 120 to access a redirect or proxy page that is managed by the backend redirect page 142 in the backend platform 140. The backend redirect page 142 may be a QR service that does not render a webpage, but instead redirects the user's browser to the intake page 112. Because the redirect page is not rendered or loaded in the browser, the user does not have an opportunity to bookmark the link or address of the redirect page.

The link may be associated with a specific location. For example, a business may have different machine-readable indicia 130 for different business locations. This may allow the website owner to track which business location provided the user access to the system. It also may allow the link to access a specific backend redirect page 142 on a backend platform 140 that services the specific business location.

The link may be associated with a specific person. For example, an employee in a business may have a machine-readable indicia 130 which accesses the backend redirect page 142, but which is unique or includes an identifier of the individual employee. This may allow the website owner to track which employee provided the user access to the system.

The backend redirect page 142 may generate a unique session identifier (ID) for the user. In some embodiments, the configurable addresses for the website 110 are configured based on the unique session ID, such as including the unique session ID in the web address for the intake page 112 and the website pages 114. The unique session ID may be added to a session list of sessions. This session list may contain unique session IDs of sessions that have been activated.

The backend platform 140 may have a session monitor 146 that keeps track of a time since the unique session ID was generated. The predetermined session length may be, for example, thirty minutes, one hour, or an estimated length of time for a user to complete the forms of the website 110. When the time exceeds the predetermined session length, the session monitor 146 may remove the unique session ID from the session list. In some embodiments, the session monitor 146 is part of the backend redirect page 142.

The session list may be stored in the backend redirect page 142 or the session monitor 146. The backend redirect page 142 and the session monitor 146 may be in communication with each other to modify and maintain the session list.

The backend platform 140 may have an intake backend for frontend (referred to herein as IBFF or intake BFF) 144 for controlling access to the website 110. The intake BFF 144 may receive requests for access to the intake page 112 or the website pages 114, such as from a mobile device 120, and extract the unique session ID from the web address that is used to request access. The intake BFF 144 may contact the backend redirect page 142 or the session monitor 146 to verify whether the unique session ID is valid. The backend redirect page 142 or the session monitor 146 may check whether the unique session ID is valid and then report that information back to the intake BFF 144. If the unique session ID is valid, the intake BFF 144 grants the mobile device 120 access to the intake page 112 or one of the website pages 114, depending on which page the mobile device 120 requested access to. If the unique session ID is not valid, the intake BFF 144 denies the mobile device 120 access.

Typically, a QR code or similar readable link takes a user directly to the webpage of interest, or requires location data from a user for any kind of location restrictions to be operable. Embodiments described herein allow the website owner to limit access to the website based on a user's location without actually requiring any location data to be sent to the website from the user or user's device.

In embodiments of the present invention, in order to access the website 110, the user must have a valid unique session ID, which can only be obtained by scanning the machine-readable indicia 130 and accessing the backend redirect page 142. This unique session ID may only be valid for a limited time. For example, a timer may be started or a first timestamp may be generated when the user first accesses backend redirect page 142. The unique session ID may be invalidated when the timer is active longer than a predetermined amount of time or after a predetermined amount of time has passed since the first timestamp. In some embodiments, after a user accesses a page in website 110, such as intake page 112 or website page 114, the timer is reset or a second timestamp is generated and replaces the first timestamp. This may prevent the user's session from ending prematurely while still using the website 110.

The user may not be able to bookmark the backend redirect page 142 because it is not loaded in the browser. The user may only bookmark pages in the website 110, such as intake page 112 or website page 114. No new unique session ID will be generated by accessing such pages, even if the user intends to start a new session, as new unique session IDs are only generated by accessing the backend redirect page 142.

If the user tries to access the website 110 directly using one of the dynamic addresses that was generated for their last session (e.g., through the bookmark of intake page 112), they will be using the unique session ID of that specific dynamic address. They will only be able to access the website 110 if the previous unique session ID is still valid. By setting the predetermined time limit, the website owner can limit to specific locations access to the machine-readable indicia 130. Essentially, the user will be limited based on when and where the machine-readable indicia 130 is available to start a new session.

For example, employees at a business location may be the only ones who can provide the machine-readable indicia 130. As a result, customers would only be able to access the website 110 at the business location and for a short time thereafter. The business can thus restrict access to the website without having to violate the privacy of the customer or request the customer to disclose the location information of their mobile device.

Figure 2:
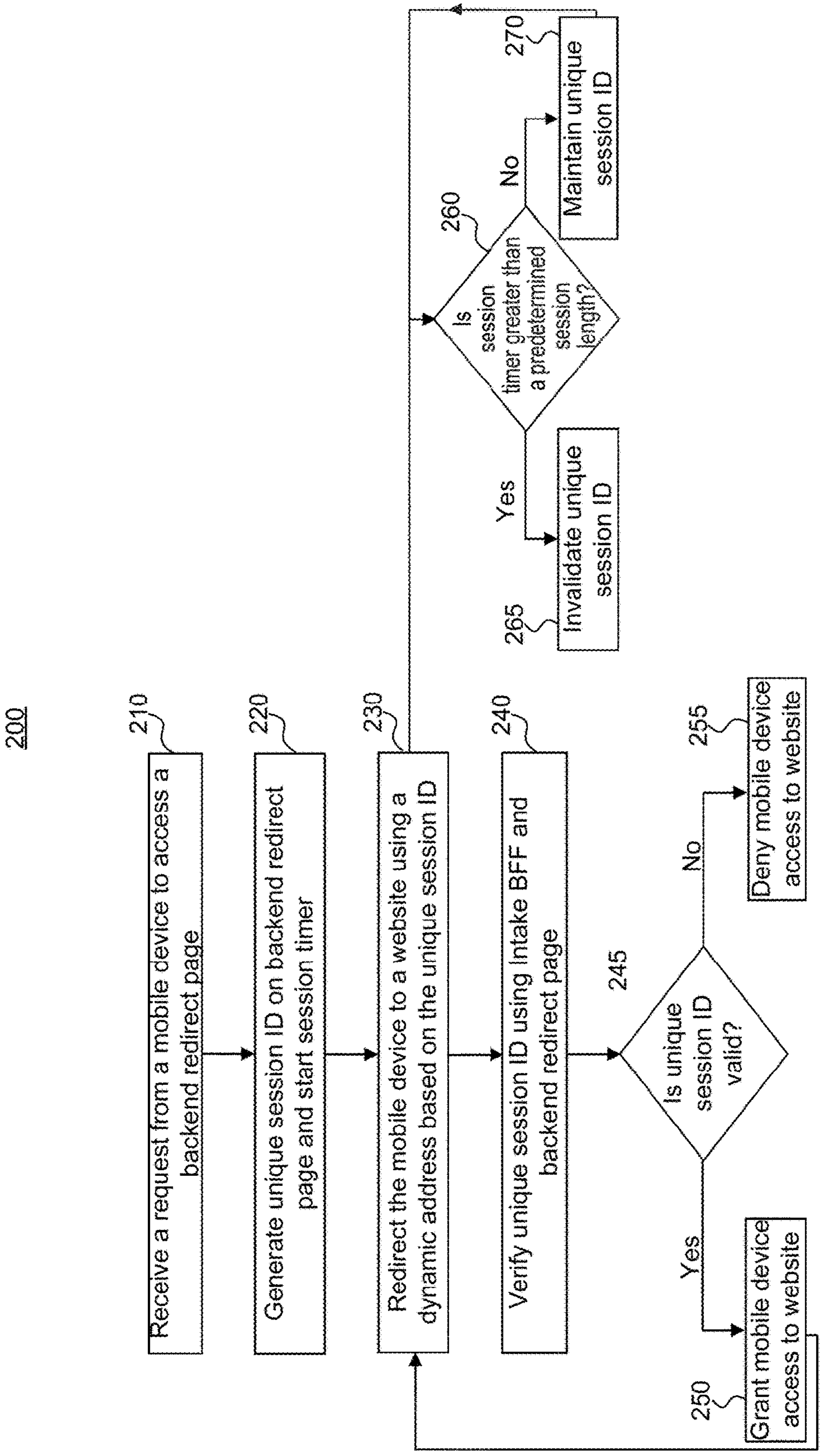
FIG. 2 is a flowchart illustrating a method for performing access restriction to a website, according to some embodiments.

FIG. 2 is a flowchart illustrating a method 200 for performing access restriction to a website, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously or in a different order than shown in FIG. 2, as will be understood by a person of ordinary skill in the art.

Method 200 shall be described with reference to FIG. 1. However, method 200 is not limited to that example embodiment.

In 210, the backend redirect page 142 receives a request from the mobile device 120 to access the backend redirect page 142 through a link. The link may be the machine-readable indicia 130 or may be encoded into the machine-readable indicia 130, and the link may be activated using an electronic reader on the mobile device 120. For example, if the link is a QR code, the electronic reader may be a QR code reader. Activating the link may access the backend redirect page 142 using an address encoded into the machine-readable indicia 130.

In 220, the backend redirect page 142 generates a unique session ID and the session monitor 146 starts a session timer. The backend redirect page 142 may store the unique session ID in a list of active sessions. The list of active sessions may be specific to the intake page 112 associated with the link.

The list of active sessions may include an activity identifier for which the unique session ID has been assigned, the session timer for the unique session identifier, and a personnel or employee identifier. These may each be associated with the unique session ID to which they correspond. The activity identifier may identify the specific website 110 or the type of activity that a user is performing on website 110. The personnel identifier may be based on or encoded into the machine-readable indicia 130 activated by the mobile device 120.

For example, a user initiating a session may be assigned a unique session ID for that session with a corresponding session timer indicating when the session started, an activity identifier indicating that the user is filling out a form to be pre-approved for an auto loan, and an employee identifier indicating a salesman who is helping the user. This information may be stored in the list of active sessions as an entry for the session.

The backend redirect page 142 may configure configurable or dynamic addresses for pages in the website 110, such as intake page 112 and website pages 114, using the unique session ID. The dynamic addresses may be based on or include the unique session ID in the address. For example, the unique session ID may be appended to the end of part of a website address, or embedded within part of the website address.

In 230, the backend redirect page 142 redirects the mobile device 120 to the website 110 using the dynamic address based on unique session ID. The backend redirect page 142 may redirect the mobile device 120 from the backend redirect page 142 to a page in the website 110, such as intake page 112 or one of the website pages 114 using the dynamic address for the intake page 112 that was configured in step 220. It is to be understood that the first time a user accesses the website 110 in a given session, the user is directed to the intake page 112, but that future access to the website 110 will navigate to pages based on the links selected, such as links on the intake page 112 or website pages 114 that connect to other pages in the website pages 114.

The mobile device 120 may attempt to load the page of the website 110 in a browser on the mobile device 120 using the dynamic address. The website 110 may generate a request to verify the unique session ID associated with the dynamic address for the page.

In 240, the backend redirect page 142 and the intake BFF 144 verify the unique session ID. The intake BFF 144 may receive a request to access the website 110 from the mobile device 120's attempt to access the website 110 in step 230. This request may come, for example, from the website 110. The intake BFF 144 may determine the unique session ID from the dynamic address used in the access request. For example, if the dynamic address includes the unique session ID as part of the dynamic address, the intake BFF will extract the unique session ID from that portion of the dynamic address.

The intake BFF 144 may send the determined unique session ID to the backend redirect page 142 for verification. The backend redirect page 142 may compare the unique session ID to a list of the active sessions that are valid.

In 245, the backend redirect page 142 determines whether the unique session ID is valid. If the unique session ID is present in the list of active sessions, then the unique session ID is considered to be valid. If the unique session ID is not present in the list of active sessions, then the unique session ID is considered to be invalid. The backend redirect page 142 then provides the validation result to the intake BFF 144, which then takes the appropriate action.

In some embodiments, the functions of the backend redirect page 142 in steps 240 and 245 may be performed by both the backend redirect page 142 and the session monitor 146 or by the session monitor 146 alone.

For valid unique session IDs, the method 200 proceeds to step 250. In 250, the intake BFF 144 grants the mobile device 120 access to the website 110. The method 200 may then return to step 230.

For invalid unique session IDs, the method 200 proceeds to step 255. In 255, the intake BFF 144 denies the mobile device 120 access to the website 110. The method 200 may then terminate for the given access attempt.

As a related but separate function in the method 200, step 230 also proceeds to step 260. In 260, the backend platform 140 determines whether the session timer is greater than a predetermined session length. This may be performed by the session monitor 146, the backend redirect page 142, or both. In some embodiments, the session timer is maintained within the list of active sessions.

If the session timer is greater than the predetermined session length, then method 200 proceeds to step 265. In 265, the session monitor 146 or the backend redirect page 142 invalidate the unique session ID. This may be accomplished by removing the unique session ID from the list of active sessions.

If the session timer is less than the predetermined session length, then method 200 proceeds to step 270. In 270, the session monitor 146 or the backend redirect page 142 maintains the unique session ID in the list of active sessions. Maintaining the list of active sessions may not require a specific action to be taken, as the list of active sessions may be stored or maintained in memory that is part of or allocated to the backend redirect page 142 or the session monitor 146.

Step 270 may return to step 260 to further monitor the session timer. It should be understood that steps 260, 265, and 270 may be performed continually or periodically as time passes to ensure that unique session IDs are maintained or invalidated. Thus, these steps may be performed for any unique session ID generated by step 220 during and between other steps of method 200.

In some embodiments, when a unique session ID becomes invalid while the user is using the website 110 but before completion, the user is denied access to the website page 114 when the user attempts to access the next website page 114. In order to access the website 110 again, the user must rescan the machine readable indicia 130 to generate a new unique session ID.

Figure 3:
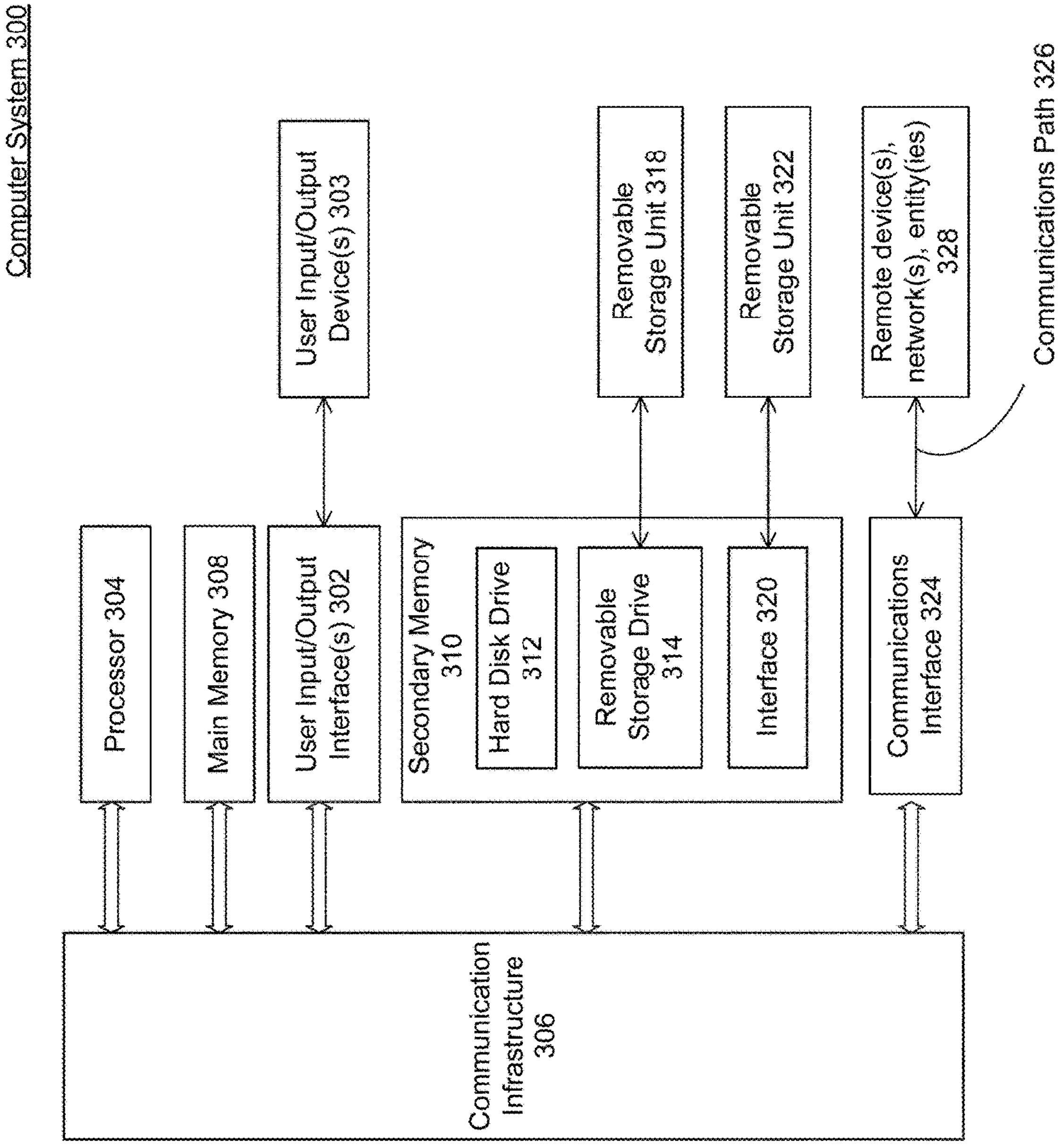
FIG. 3 depicts an example computer system useful for implementing various embodiments.

FIG. 3 depicts an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method for controlling access to a website, comprising:

receiving a first request from a mobile device to access the website;

based on the first request, generating a unique session identifier with a backend redirect page that does not visibly load to the mobile device;

receiving a second request from the mobile device to access the website, wherein the second request includes the unique session identifier as part of a dynamic address associated with a scanning of a machine-readable indicia;

directing a browser on the mobile device to the website using the dynamic address, wherein the website has one or more pages;

verifying whether the unique session identifier for the dynamic address is valid; and based on the verifying, either granting or denying the mobile device access to the website, wherein granting access occurs when the unique session identifier is valid, and denying access occurs when the unique session identifier is invalid.

2. The method of claim 1, wherein the machine-readable indicia corresponds to a geolocation.

3. The method of claim 1, further comprising:

starting a session timer for the unique session identifier in response to the first request, wherein the unique session identifier is active for a predetermined amount of time.

4. The method of claim 3, further comprising:

resetting the session timer after an intake page for the website is accessed by the browser.

5. The method of claim 3, wherein the verifying comprises:

verifying whether the unique session identifier for the dynamic address is valid based on whether the session timer is less than the predetermined amount of time.

6. The method of claim 1, further comprising:

generating the dynamic address for the website, wherein the dynamic address includes the unique session identifier generated by the backend redirect page.

7. The method of claim 1, further comprising:

redirecting, by the backend redirect page, the browser on the mobile device to the website using the dynamic address in response to the first request.

8. A system for controlling access to a website, the system comprising:

one or more processors;

a memory communicatively coupled to the one or more processors, the memory storing instructions which, when executed by the one or more processors, cause the one or more processors to perform operations comprising:

receiving a first request from a mobile device to access the website;

based on the first request, generating a unique session identifier with a backend redirect page that does not visibly load to the mobile device;

receiving a second request from the mobile device to access the website, wherein the second request includes the unique session identifier as part of a dynamic address associated with a scanning of a machine-readable indicia;

directing a browser on the mobile device to the website using the dynamic address, wherein the website has one or more pages;

verifying whether the unique session identifier for the dynamic address is valid; and based on the verifying, either granting or denying the mobile device access to the website, wherein granting access occurs when the unique session identifier is valid, and denying access occurs when the unique session identifier is invalid.

9. The system of claim 8, wherein the machine-readable indicia corresponds to a geolocation.

10. The system of claim 8, the operations further comprising:

starting a session timer for the unique session identifier in response to the first request, wherein the unique session identifier is active for a predetermined amount of time.

11. The system of claim 10, the operations further comprising:

resetting the session timer after an intake page for the website is accessed by the browser.

12. The system of claim 10, wherein the verifying comprises:

verifying whether the unique session identifier for the dynamic address is valid based on whether the session timer is less than the predetermined amount of time.

13. The system of claim 8, the operations further comprising:

generating the dynamic address for the website, wherein the dynamic address includes the unique session identifier generated by the backend redirect page.

14. The system of claim 8, the operations further comprising:

redirecting, by the backend redirect page, the browser on the mobile device to the website using the dynamic address in response to the first request.

15. A non-transitory computer readable storage medium having computer readable instructions stored therein that, when executed by a computer, cause the computer to perform operations comprising:

receiving a first request from a mobile device to access a website;

based on the first request, generating a unique session identifier with a backend redirect page that does not visibly load to the mobile device;

receiving a second request from the mobile device to access the website, wherein the second request includes the unique session identifier as part of a dynamic address associated with a scanning of a machine-readable indicia;

directing a browser on the mobile device to the website using the dynamic address, wherein the website has one or more pages;

verifying whether the unique session identifier for the dynamic address is valid; and based on the verifying, either granting or denying the mobile device access to the website, wherein granting access occurs when the unique session identifier is valid, and denying access occurs when the unique session identifier is invalid.

16. The non-transitory computer readable storage medium of claim 15, the operations further comprising:

starting a session timer for the unique session identifier in response to the first request, wherein the unique session identifier is active for a predetermined amount of time.

17. The non-transitory computer readable storage medium of claim 16, the operations further comprising:

resetting the session timer after an intake page for the website is accessed by the browser.

18. The non-transitory computer readable storage medium of claim 16, wherein the verifying comprises:

verifying whether the unique session identifier for the dynamic address is valid based on whether the session timer is less than the predetermined amount of time.

19. The non-transitory computer readable storage medium of claim 15, the operations further comprising:

generating the dynamic address for the website, wherein the dynamic address includes the unique session identifier generated by the backend redirect page.

20. The non-transitory computer readable storage medium of claim 15, the operations further comprising:

redirecting, by the backend redirect page, the browser on the mobile device to the website using the dynamic address in response to the first request.

* * * * *